United States Patent
Del Gatto et al.

(10) Patent No.: US 12,299,331 B2
(45) Date of Patent: *May 13, 2025

(54) MANAGED MEMORY SYSTEMS WITH MULTIPLE PRIORITY QUEUES

(71) Applicant: Micron Technology, Inc., Boise, ID (US)

(72) Inventors: Nicola Del Gatto, Cassina de' Pecchi (IT); Massimiliano Patriarca, Milan (IT); Antonino Capri, Bergamo (IT); Emanuele Confalonieri, Segrate (IT); Angelo Alberto Rovelli, Agrate Brianza (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/583,540

(22) Filed: Feb. 21, 2024

(65) Prior Publication Data
US 2024/0272831 A1    Aug. 15, 2024

Related U.S. Application Data

(63) Continuation of application No. 16/951,985, filed on Nov. 18, 2020, now Pat. No. 11,914,893.

(51) Int. Cl.
*G06F 3/06* (2006.01)

(52) U.S. Cl.
CPC .......... *G06F 3/0659* (2013.01); *G06F 3/0604* (2013.01); *G06F 3/0635* (2013.01); *G06F 3/0656* (2013.01); *G06F 3/0679* (2013.01)

(58) Field of Classification Search
CPC ...... G06F 3/0604; G06F 3/061; G06F 3/0635; G06F 3/0656; G06F 3/0659; G06F 3/0679; G11C 16/10; G11C 16/26
See application file for complete search history.

(56) References Cited

U.S. PATENT DOCUMENTS

| | | | |
|---|---|---|---|
| 2009/0172260 A1 | 7/2009 | Olbrich et al. | |
| 2010/0169604 A1 | 7/2010 | Trika et al. | |
| 2015/0095605 A1* | 4/2015 | Roberts | G06F 3/0659 |
| | | | 711/167 |
| 2019/0391755 A1 | 12/2019 | Lee et al. | |
| 2020/0050395 A1 | 2/2020 | Bavishi et al. | |

* cited by examiner

*Primary Examiner* — Larry T MacKall
(74) *Attorney, Agent, or Firm* — Holland & Hart LLP

(57) ABSTRACT

Methods, systems, and devices for managed memory systems with multiple priority queues are described. Memory access commands may be received from a host and stored in a command queue. First and second subsets of the commands, respectively associated with first and second priorities, may be determined. The first and second subsets may be routed from the command queue to first and second queues, respectively. The first and second subsets may be processed from the first and second queues to third and fourth queues, respectively, at a storage controller, according to first and second processes that may be run concurrently according to parameters for prioritization between the first and second priorities. Data associated with the commands may be received from the host, temporarily stored in a buffer, then moved to a storage memory (for write commands) or retrieved from the storage memory, temporarily stored in the buffer, then transmitted to the host (for read commands).

20 Claims, 7 Drawing Sheets

MANAGED MEMORY SYSTEMS WITH MULTIPLE PRIORITY QUEUES

CROSS REFERENCE

The present application for patent is a continuation of U.S. patent application Ser. No. 16/951,985 by Del Gatto et al., entitled "MANAGED MEMORY SYSTEMS WITH MULTIPLE PRIORITY QUEUES," filed Nov. 18, 2020, assigned to the assignee hereof, and is expressly incorporated by reference in its entirety herein.

FIELD OF TECHNOLOGY

The following relates generally to one or more systems for memory and more specifically to managed memory systems with multiple priority queues.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Current managed-NAND systems are implemented with a combination of hardware and firmware. The hardware may include logic for data and command processing such as queues for commands and logic for moving data between an interface and a buffer and the buffer and storage. The firmware may perform command processing. In some cases, commands may be associated with multiple different priorities. Because the firmware is running on a processor (e.g., a CPU) with an execution unit (e.g., a single execution unit), managing processing of commands according to their priority involves challenges in implementing the priority for processing commands and preventing stalling due to multiple queue priorities.

Techniques described herein involve implementing multiple processes for handling commands from hardware and firmware queues. The managed NAND system may implement a command queue for receiving commands and separate hardware queues for each priority in the front end and back end. A processor may concurrently run the command handler processes and move commands from the hardware queue in the front end to hardware queues in the back end according to priority. For example, the command handlers in the firmware may have parameters associated with the prioritization, and execution of the processes may be controlled or informed by the parameters. The managed NAND system may have separate buses for command passing from the front end to the back end.

Features of the disclosure are initially described in the context of systems and devices as described with reference to FIGS. 1 and 2. Features of the disclosure are described in the context of systems, devices, and diagrams as described with reference to FIGS. 3-5. These and other features of the disclosure are further illustrated by and described with reference to an apparatus diagram and a flowchart that relate to managed memory systems with multiple priority queues as described with reference to FIGS. 6 and 7.

Figure 1:
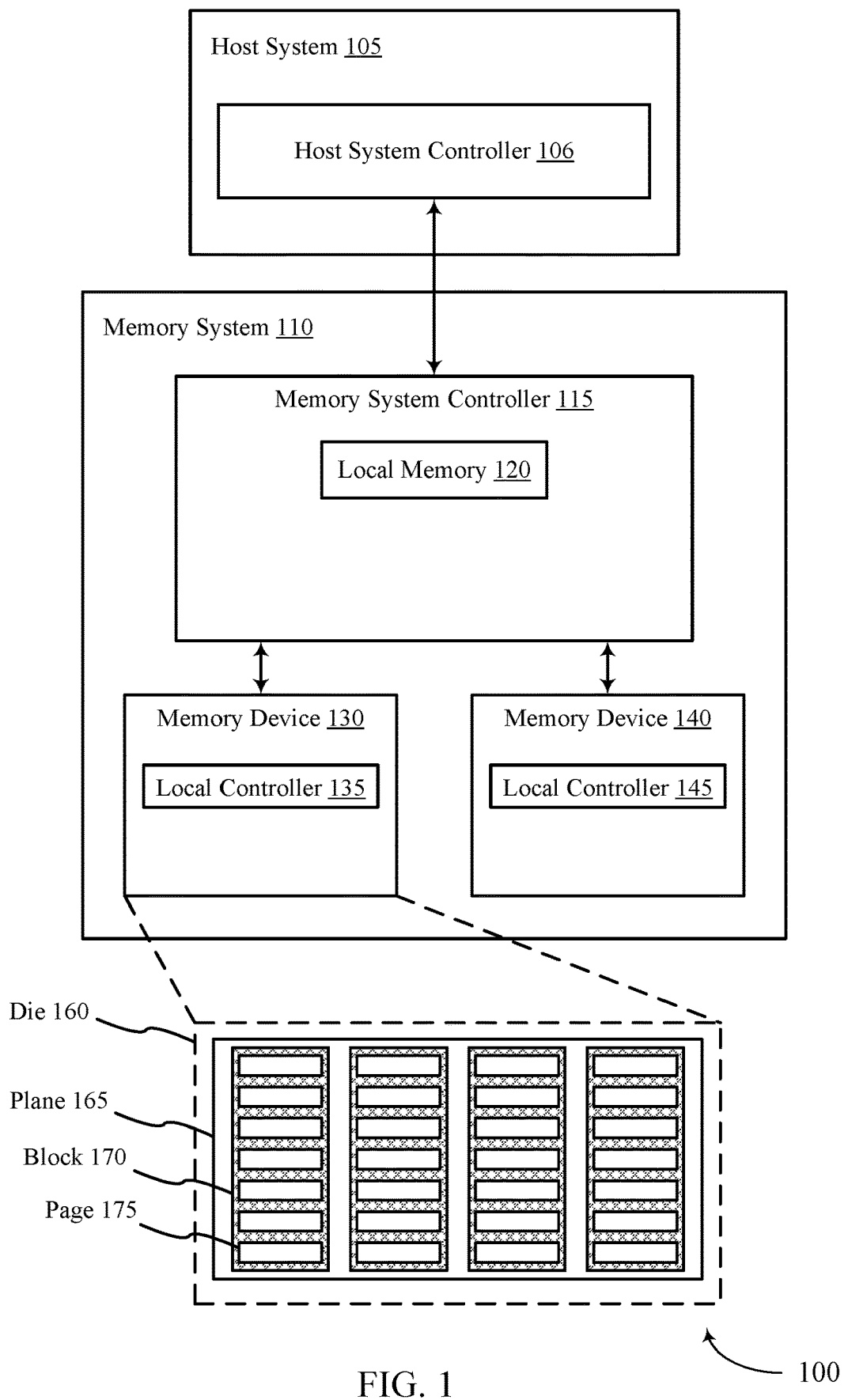
FIG. 1 illustrates an example of a system that supports managed memory systems with multiple priority queues in accordance with examples as disclosed herein.

FIG. 1 is an example of a system 100 that supports managed memory systems with multiple priority queues in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, a USB interface, a Fiber Channel, a Small Computer System Interface (SCSI), a Serial Attached SCSI (SAS), a Double Data Rate (DDR), a dual in-line memory module (DIMM) interface (e.g., DIMM socket interface that supports DDR), an Open NAND Flash Interface (ONFI), and a Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support managed memory systems with multiple priority queues. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform one or more associated functions as described herein.

In some cases, a memory system 110 may utilize a memory system controller 115 to provide a managed memory system that may include, e.g., one or more memory arrays and related circuitry combined with a local (e.g., on-die or in-package) controller (e.g., local controller 135 or local controller 145). An example of a managed memory system is a managed NAND (MNAND) system.

Figure 2:
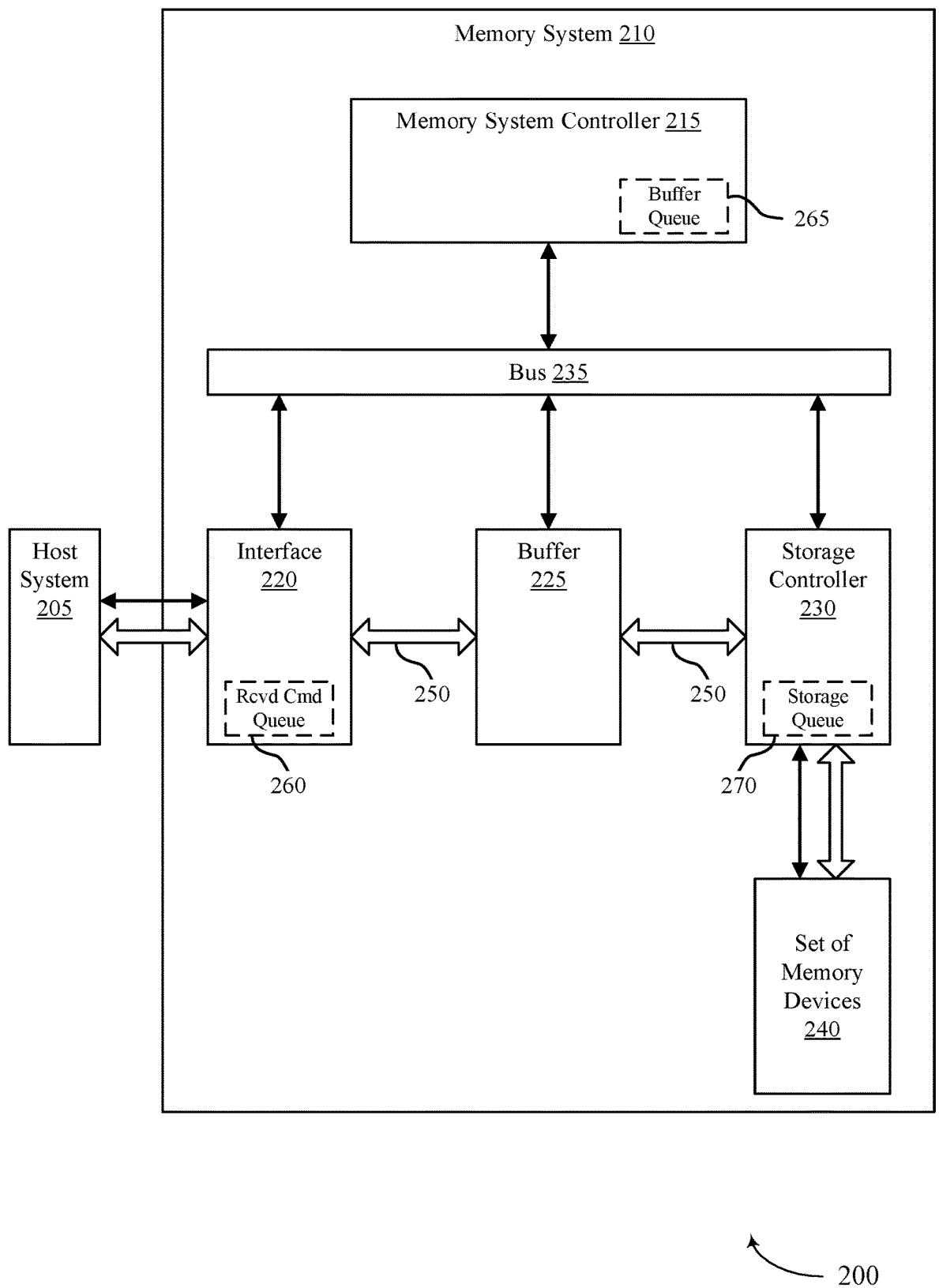
FIG. 2 illustrates an example of a system that supports managed memory systems with multiple priority queues in accordance with examples as disclosed herein.

FIG. 2 illustrates an example of a system 200 that supports managed memory systems with multiple priority queues in accordance with examples as disclosed herein. The system 200 may be an example of a system 100 as described with reference to FIG. 1. The system 200 may include a memory system 210 configured to store data received from the host system 205 and to send data to the host system 205, when requested by the host system 205 using access commands (e.g., read commands or write commands). The system 200 may implement aspects of system 100 as described with reference to FIG. 1. For example, the memory system 210 and the host system 205 may be examples of the memory system 110 and the host system 105, respectively.

Memory system 210 may include a set of memory devices 240 to store data transferred between memory system 210 and the host system 205, e.g., in response to receiving access commands from the host system 205, as described below. The set of memory devices 240 may include one or more memory devices as described with reference to FIGS. 1 and 2. For example, the set of memory devices 240 may include NAND memory, PCM, self-selecting memory, 3D XPoint, other chalcogenide-based memories, FERAM, MRAM, NOR (e.g., NOR flash) memory, STT-MRAM, CBRAM, RRAM, or OxRAM.

Memory system 210 may include a storage controller 230 for controlling the passing of data directly to and from the set of memory devices 240, e.g., for storing data, retrieving data, and determining memory locations in which to store data and from which to retrieve data. Storage controller 230 may communicate with memory devices 240 directly or via a bus (not shown) using a protocol specific to each type of memory device. In some cases, a single storage controller 230 may be used to control multiple memory devices of the same or different types. In some cases, memory system 210 may include multiple storage controllers 230, e.g., a different storage controller 230 for each type of memory device 240. In some cases, storage controller 230 may implement aspects of local controller 135 as described with reference to FIG. 1.

Memory system 210 may additionally include an interface 220 for communication with the host system 205 and a buffer 225 for temporary storage of data being transferred between the host system and the set of memory devices 240. Interface 220, buffer 225, and storage controller 230, may provide functions associated with moving data between the host system 205 and the set of memory devices 240, e.g., as shown by data path 250, and may be collectively referred to as data path components.

Using buffer 225 to temporarily store data during transfers may allow data to be buffered as commands are being processed, thereby reducing latency between commands and allowing arbitrary data size associated with commands. This may also allow bursts of commands to be handled and the buffered data may be stored or transmitted asynchronously with the burst. Buffer 225 may include relatively fast memory, e.g., certain types of volatile memory, such as DRAM, 3D XPoint, or MRAM and/or hardware accelerators to allow fast storage and retrieval of data to and from buffer 225. Buffer 225 may include data path switching components (e.g., a crosspoint switch) for bi-directional data transfer between buffer 225 and other components.

The temporary storage of data within buffer 225 may refer to the storage of data in buffer 225 during the execution of access commands. That is, upon completion of an access command, the associated data may no longer be maintained in buffer 225 (e.g., may be overwritten with data for additional access commands). In addition, buffer 225 may be a non-cache buffer. That is, data may not be read directly from buffer 225 by the host system 205. For example, read commands may be placed on a queue without an operation to match the address to addresses already in the buffer (e.g., without a cache address match, content addressable memory (CAM), or lookup operation).

Memory system 210 may additionally include a memory system controller 215 for executing the commands received from the host system 205 and controlling the data path components in the moving of the data. Memory system controller 215 may be an example of the memory system controller 115 as described with reference to FIG. 1. A bus 235 may be used to communicate between the system components.

In some cases, one or more queues, e.g., a received command queue 260, a buffer queue 265, and a storage queue 270, may be used to control the processing of the access commands and the movement of the corresponding data. This may be beneficial, e.g., when more than one access command from the host system 205 is processed concurrently by memory system 210. Although received command queue 260, buffer queue 265, and storage queue 270 are depicted at interface 220, memory system controller 215 and storage controller 230, respectively, this is illustrative only. Queues, if used, may be positioned anywhere within memory system 210. In some cases, received command queue 260 and storage queue 270 may be hardware queues (e.g., dedicated registers or memory in interface 220 and storage controller 230, respectively).

Data transferred between the host system 205 and the set of memory devices 240 may take a different path in memory system 210 than non-data information (e.g., commands, status information). For example, the system components in memory system 210 may communicate with each other using bus 235, while the data may use data path 250 through the data path components instead of bus 235. Memory system controller 215 may control how and when data is transferred between the host system 205 and the set of memory devices 240 by communicating with the data path components over bus 235, e.g., using a protocol specific to memory system 210.

When a host system 205 transmits access commands to memory system 210, the commands may be received by interface 220, e.g., according to a protocol (e.g., a UFS protocol or an eMMC protocol). Thus, interface 220 may be considered a front end of memory system 210. Upon receipt of each access command, interface 220 may communicate the command to memory system controller 215, e.g., via bus 235. In some cases, each command may be added to received command queue 260 by interface 220 to communicate the command to memory system controller 215.

Memory system controller 215 may determine that an access command has been received based on the communication from interface 220. In some cases, memory system controller 215 may determine the access command has been received by retrieving the command from received command queue 260. The command may be removed from received command queue 260 after it has been retrieved therefrom, e.g., by memory system controller 215. In some cases, memory system controller 215 may cause interface 220, e.g., via bus 235, to remove the command from received command queue 260.

Upon the determination that an access command has been received, memory system controller 215 may execute the access command. For a read command, this may mean obtaining data from the set of memory devices 240 and transmitting the data to the host system 205. For a write command, this may mean receiving data from the host system 205 and moving the data to the set of memory devices 240.

In either case, memory system controller 215 may use buffer 225 for temporary storage of the data being received from or sent to the host system 205. Buffer 225 may be considered a middle end of memory system 210. In some cases, buffer address management (e.g., pointers to address locations in the buffer) may be performed by hardware circuits (e.g., logic gate circuits).

To process a write command received from the host 205, memory system controller 215 may first determine if buffer 225 has sufficient available space to store the data associated with the command. For example, memory system controller 215 may determine, e.g., via firmware (e.g., controller firmware), an amount of space within buffer 225 that may be available to store data associated with the write command.

In some cases, buffer queue 265 may be used to aid with buffer storage of data associated with write commands. Buffer queue 265 may include the access commands associated with data currently stored in buffer 225. In some cases, the access commands may be added to buffer queue 265 by memory system controller 215 and may remain in buffer queue 265 while the associated data is stored in buffer 225. In some cases, each command in buffer queue 265 may be associated with an address at buffer 225. That is, pointers may be maintained that indicate where in buffer 225 the data associated with each command is stored. Using buffer queue 265, multiple access commands may be processed concurrently.

If buffer 225 has sufficient space to store the write data, memory system controller 215 may cause interface 220, e.g., via bus 235, to transmit an indication of availability to the host system 205 (e.g., a "ready to transfer" indication), e.g., according to a protocol (e.g., a UFS protocol or an eMMC protocol). As interface 220 subsequently receives from the host system 205 the data associated with the write command, interface 220 may transfer the data to buffer 225 for temporary storage using data path 250. In some cases, interface 220 may obtain from buffer queue 265 the location within buffer 225 to store the data. Interface 220 may indicate to memory system controller 215, e.g., via bus 235, when the data transfer to buffer 225 has been completed.

Once the write data has been stored in buffer 225 by interface 220, the data may be transferred out of buffer 225 and stored in a memory device 240. This may be done using storage controller 230. For example, memory system controller 215 may cause, e.g., via bus 235, storage controller 230 to retrieve the data out of buffer 225 using data path 250, and transfer the data to a memory device 240. Storage controller 230 may be considered a back end of memory system 210. Storage controller 230 may indicate to memory system controller 215, e.g., via bus 235, when the data transfer to a memory device of the set of memory devices 240 has been completed.

In some cases, storage queue 270 may be used to aid with the transfer of write data. Storage queue 270 may include entries for each access command, and may include, e.g., a buffer pointer (e.g., an address) that may indicate where in buffer 225 the data associated with the command is stored and a storage pointer (e.g., an address) that may indicate the location in the set of memory devices 240 associated with the data. In some cases, storage controller 230 may obtain from buffer queue 265 or storage queue 270 the location within buffer 225 from which to obtain the data. Storage controller 230 may manage the locations within the set of memory devices 240 to store the data (e.g., performing wear-leveling, garbage collection, and the like). The entries may be added to storage queue 270, e.g., by memory system controller 215. The entries may be removed from the storage queue 270, e.g., by storage controller 230 or memory system controller 215 upon completion of the transfer of the data.

To process a read command received from the host 205, memory system controller 215 may again first determine if buffer 225 has sufficient available space to store the data associated with the command. For example, memory system controller 215 may determine, e.g., via firmware (e.g., controller firmware) or hardware, an amount of space within buffer 225 that may be available to store data associated with the read command.

In some cases, buffer queue 265 may be used to aid with buffer storage of data associated with read commands in a similar manner as discussed above with respect to write commands.

If buffer 225 has sufficient space to store the read data, memory system controller 215 may cause, e.g., via bus 235, storage controller 230 to retrieve the data associated with the read command from a memory device 240 and store the data in buffer 225 for temporary storage using data path 250. Storage controller 230 may indicate to memory system controller 215, e.g., via bus 235, when the data transfer to buffer 225 has been completed.

In some cases, storage queue 270 may be used to aid with the transfer of read data. In some cases, storage controller 230 may obtain from storage queue 270 the location within the set of memory devices 240 from which to retrieve the data. In some cases, storage controller 230 may obtain from buffer queue 265 the location within buffer 225 to store the data. In some cases, storage controller 230 may obtain from storage queue 270 the location within buffer 225 to store the data.

Once the data has been stored in buffer 225 by storage controller 230, the data may be transferred out of buffer 225 and sent to the host system 205. For example, memory system controller 215 may cause, e.g., via bus 235, interface 220 to retrieve the data out of buffer 225 using data path 250 and transmit the data to the host system 205, e.g., according to a protocol (e.g., a UFS protocol or an eMMC protocol). Interface 220 may indicate to memory system controller 215, e.g., via bus 235, when the data transmission to the host system 205 has been completed.

Memory system controller 215 may execute received commands according to an order (e.g., a first-in, first-out order, according to the order of the received command queue 260). For each command, memory system controller 215 may cause data corresponding to the command to be moved into and out of buffer 225, as discussed above. As the data is moved into and stored within buffer 225, the command may remain in buffer queue 265. A command may be removed from buffer queue 265, e.g., by memory system controller 215, when the processing of the command has been completed (e.g., when data corresponding to the access command has been transferred out of buffer 225). When a command is removed from buffer queue 265, the address previously storing the data associated with that command may be available to store data associated with a new command.

Memory system controller 215 may additionally be configured for operations associated with the set of memory devices 240. For example, memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 205 and physical addresses (e.g., physical block addresses) associated with memory cells within the set of memory devices 240. That is, the host system 205 may issue commands indicating one or more LBAs and the memory system controller 215 may identify one or more physical block addresses indicated by the LBAs. In some cases, one or more contiguous LBAs may be noncontiguous physical block addresses. In some cases, storage controller 230 may be configured to perform one or more of the above operations in conjunction with or instead of memory system controller 215. In some cases, memory system controller 215 may perform the functions of storage controller 230 and storage controller 230 may be omitted.

Figure 3:
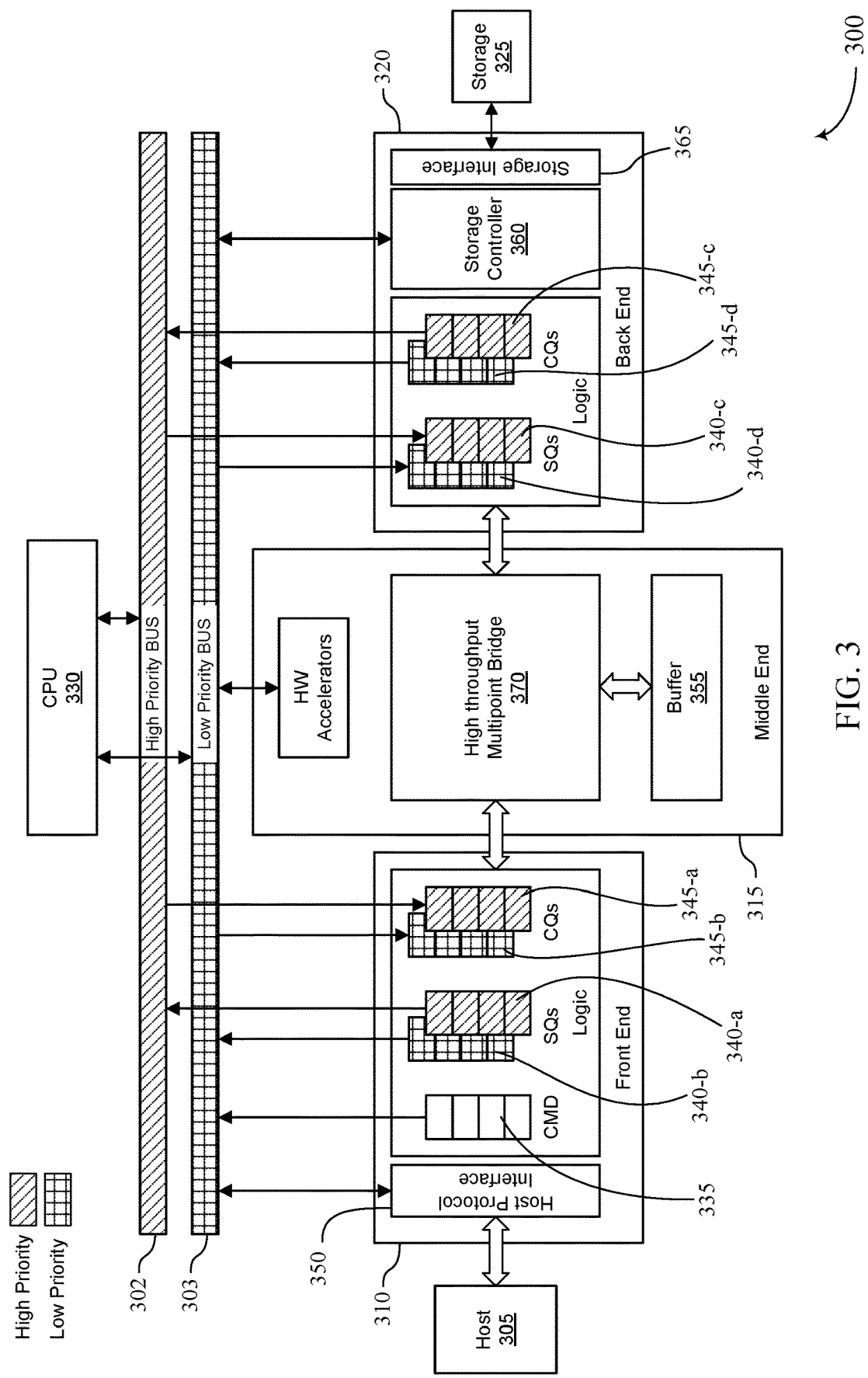
FIG. 3 illustrates an example of a system that supports managed memory systems with multiple priority queues in accordance with examples as disclosed herein.

FIG. 3 illustrates an example of a system 300 that supports managed memory systems with multiple priority queues in accordance with examples as disclosed herein. The system 300 may be configured to store data received from a host system 305 and to send data to the host system 305, when requested by the host system 305 using memory access commands (e.g., read commands or write commands). The system 300 may be an example of a system 200 or memory system 210 as described with reference to FIG. 2.

The system 300 may include a front end 310, a middle end 315, and a back end 320 for moving data between the host 305 and a storage 325. The system 300 may also include a CPU 330 for controlling the movement of the data by communicating with the components via a high priority bus 302 and a low priority bus 303. High priority bus 302 may be used for higher priority traffic than low priority bus 303. In some cases, there may be only a single bus instead of separate high and low priority buses. The system 300 may implement aspects of memory system 210 as described with reference to FIG. 2. For example, front end 310, middle end 315, and back end 320 may incorporate aspects of interface 220, buffer 225, and storage controller 230, respectively. As such, front end 310, middle end 315, and back end 320 may be referred to herein as interface 220, buffer 225, and storage controller 230, respectively. CPU 330 may be an example of memory system controller 215 and may include an execution unit (not shown). CPU 330 may include a single execution unit. The execution unit may include, for example, an arithmetic logic unit (ALU), control unit (CU), address generation unit (AGU), floating-point unit (FPU), load-store unit (LSU), or branch execution unit (BEU), and may be called a "core."

System 300 may also include one or more queues to control the processing of the access commands and the movement of the corresponding data. A command (command) queue 335 may be used to store the access commands received from the host 305. Command queue 335 may be an example of received command queue 260 discussed with reference to FIG. 2.

Submission queues (SQs) 340 and completion queues (CQs) 345 may be used to store information regarding each access command being processed, including, e.g., the command, one or more memory locations associated with the command, and a status of the processing. There may be separate SQs 340 and CQs 345 for access commands of different priorities. For example, as shown in FIG. 3, SQs 340 and CQs 345 may include SQs 340-a and 340-c and CQs 345-a and 345-c for access commands of a first priority and SQs 340-b and 340-d and CQs 345-b and 345-d for access commands of a second priority. In some cases, a first priority may correspond to a higher priority with respect to the second priority. Thus, "high" and "low" priority may be used herein to refer to "first" and "second" priority. Although the discussion herein is directed to two priorities, it is to be understood that the concepts discussed herein may be applied to systems processing access commands of more than two priorities. For example, for systems having more than two priorities, additional SQs 340 and CQs 345 may be used corresponding to additional priorities.

When the host system 305 transmits an access command to system 300, the command may be received at front end 310, e.g., by a host protocol interface 350. The access command may be added to command queue 335, e.g., by front end 310, to communicate the command to CPU 330. In some cases, access commands may be added to command queue 335 in the order they are received from the host 305.

CPU 330 may determine that an access command has been received using command queue 335. In some cases, CPU 330 may receive a signal, e.g., an IRQ signal, from front end 310 when an access command is received. In some cases, CPU 330 may monitor command queue 335 or its status to determine when a new access command has been received.

The access command information may be obtained from command queue 335, e.g., by CPU 330 via high priority bus 302 or low priority bus 303. CPU 330 may then determine the priority and type of access command, then queue up the access command for execution, accordingly, as discussed in more detail, below. The access command may be removed from command queue, e.g., by CPU 330.

To process a write command received from host 305, an entry corresponding to the write command may be added, e.g., by CPU 330, to front end CQ 345-a or CQ 345-b, based on the command's priority. In some cases, the CQ 345 entry may include a location pointer (e.g., a pointer to a memory location) indicating where within a buffer 355 of middle end 315 to temporarily store the data. In some cases the front end may obtain a next buffer pointer to be used from a hardware accelerator of middle end 315. A buffer queue may be used to keep track of buffer 355, as discussed with reference to FIG. 2.

Based on the information in the corresponding front end CQ 345 entry, the data received from host 305 may be stored, e.g., by front end 310, in buffer 355, e.g., via a multipoint bridge 370. The front end CQ 345 entry corresponding to the write command may be removed, e.g., by front end 310 or CPU 330. When the data has been stored in buffer 355, an entry may be added, e.g., by front end 310, to front end SQ 340-a or SQ 340-b, based on the command's priority, indicating that the data corresponding to the write command is in buffer 355.

Based on the entry added to front end SQ 340-a or SQ 340-b, a corresponding entry may be added, e.g., by CPU 330, to back end SQ 340-c or SQ 340-d, based on the command's priority. The back end SQ 340 entry may include a pointer to the location within buffer 355 where the data has been stored. The back end SQ 340 entry may include a location pointer. (e.g., a pointer to a memory location within a memory device 240) indicating where to store the data within storage 320. When not needed anymore, the front end SQ 340 entry may be removed, e.g., by CPU 330.

Using back end SQ 340-c and SQ 340-d, an order of processing the corresponding commands by back end 320 may be determined, e.g., by arbitration logic. Although commands in the high-priority SQ 340-c may be prioritized, the low priority SQ 340-d should still be processed in a timely manner. The arbitration logic may be one way to make sure this happens. The arbitration logic may also optimize the processing of the commands. In one example, the arbitration logic may monitor the high priority SQ 340-c and the low priority SQ 340-d, determine an order of processing the corresponding commands, and move entries correspondingly from each queue to a separate back end queue. The commands may be processed by back end 320 based on their order in the separate queue. Other arbitration schemes may also be used, as discussed below.

When the write command corresponding to the entry added to the back end SQ 340 is processed, the data corresponding to the write command may be retrieved from buffer 355 by back end 320 and stored in storage 325, e.g., by a storage controller 360, based on the back end SQ 340 entry. Storage controller 360 may be an example of storage controller 230 discussed with reference to FIG. 2.

Storage 325 may include one or more memory devices 240 as described with reference to FIG. 2. For example, the set of memory devices 240 may include NAND memory, PCM, self-selecting memory, 3D XPoint, other chalcogenide-based memories, FERAM, MRAM, NOR (e.g., NOR flash) memory, STT-MRAM, CBRAM, RRAM, or OxRAM. To communicate with the memory devices, storage controller 360 may use one or more storage interfaces 365 each employing one or more protocols specific to the types of memory devices. When not needed anymore, the back end SQ 340 entry corresponding to the write command may be removed, e.g., by back end 320 or CPU 330.

When the data has been stored in storage 325, an entry may be added, e.g., by back end 320, to back end CQ 345-c or CQ 345-d, based on the command's priority, indicating that the data corresponding to the write command has been successfully written to storage 325. Based on the entry added to back end CQ 345, CPU 330 may be apprised of the successful completion of the command. The corresponding back end CQ 345 entry may be removed, e.g., by CPU 330.

To process a read command received from host 305, one or more entries corresponding to the read command may be added, e.g., by CPU 330, to back end SQ 340-c or SQ 340-d, based on the command's priority. In some cases, a single SQ 340 entry may be used for a read command. In some cases, the read command may be decoded into several internal read command entries that are added to the corresponding back end SQ 340. In some cases, the back end SQ 340 entry may include a location pointer (e.g., a pointer to a memory location within a memory device 240) indicating where within storage 320 to obtain the data. In some cases, the SQ 340 entry may include a location pointer (e.g., a pointer to a memory location) to indicate where to temporarily store the data within buffer 355. In some cases the back end may obtain a next buffer pointer to be used from a hardware accelerator of middle end 315.

Using the information in the corresponding back end SQ 340 entry, the data associated with the read command may be retrieved from storage 325, e.g., by storage controller 360 via storage interface 365, and may temporarily store the data in buffer 355. When not needed anymore, the back end SQ 340 entry may be removed, e.g., by back end 320 or CPU 330. When the data has been stored in buffer 355, an entry may be added, e.g., by back end 320, to back end CQ 345-c or CQ 345-d, based on the command's priority, indicating that the data corresponding to the read command is in buffer 355.

Based on the entry added to back end CQ 345-c or CQ 345-d, a corresponding entry may be added, e.g., by CPU 330, to front end CQ 345-a or CQ 345-b, based on the command's priority. The front end CQ 345 entry may include a pointer to the location within buffer 355 where the data is stored. When not needed anymore, the back end CQ 345 entry may be removed, e.g., by CPU 330.

Based on the entry added to the front end CQ 345-a or CQ 345-b, the data corresponding to the read command may be obtained from buffer 355 (e.g., using the location pointer within the corresponding CQ 345 entry) and transmitted to the host 305, e.g., by front end 310 via host protocol interface 350. When not needed anymore, the front end CQ 345 entry may be removed, e.g., by CPU 330 or front end 310.

In determining an order of transmitting read commands to the host 305, the entries in the high-priority CQ 345-a may be prioritized over the entries in the low priority CQ 345-b. When the data has been transmitted to the host 305, an entry may be added, e.g., by front end 310, to front end SQ 340-a or SQ 340-b, based on the command's priority, indicating that the data has been successfully transmitted to the host. Based on the entry added to front end SQ 340, CPU 330 may be apprised of the successful completion of the command. The corresponding front end SQ 340 entry may be removed, e.g., by CPU 330.

Figure 4:
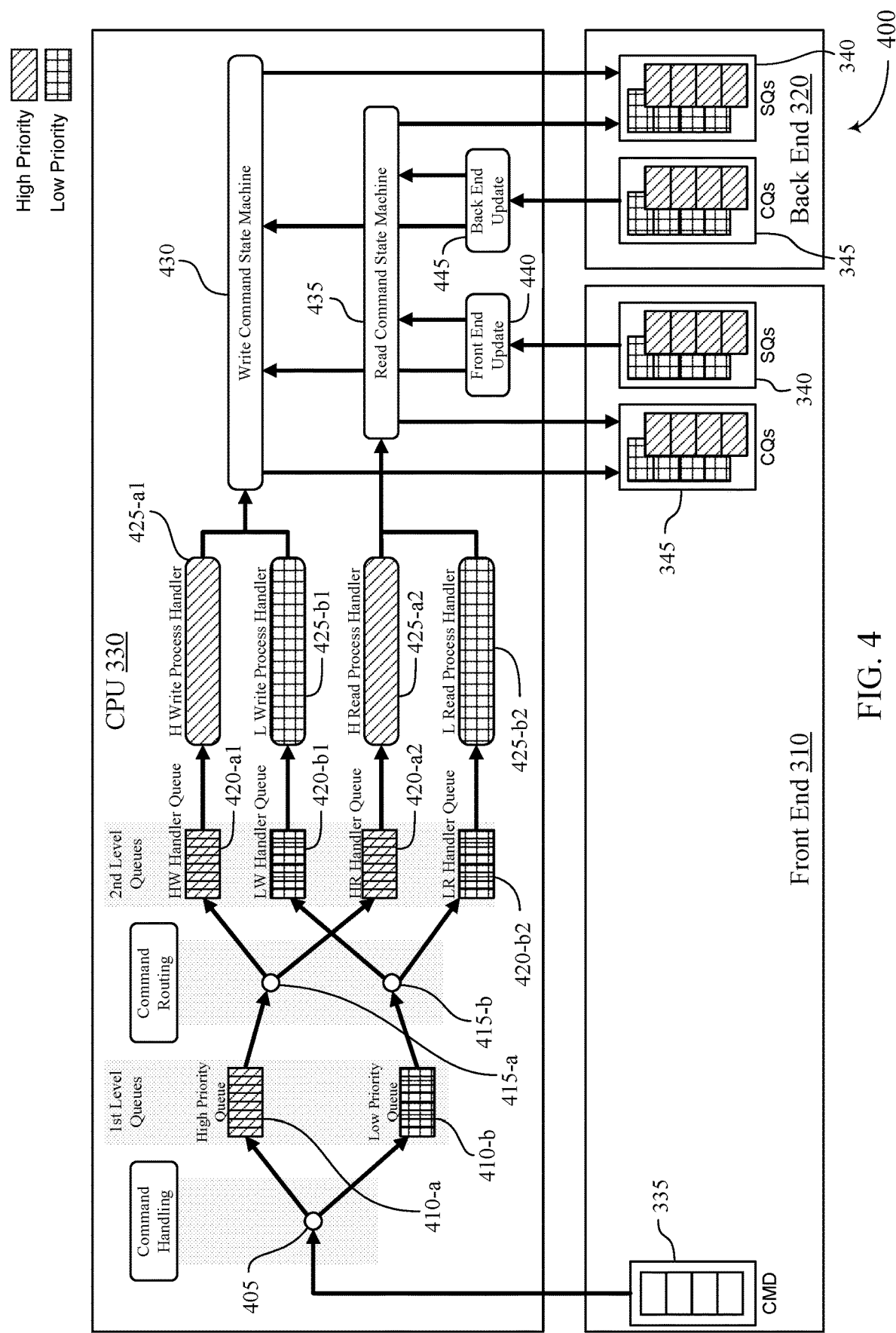
FIG. 4 illustrates an example of a system control diagram that supports managed memory systems with multiple priority queues in accordance with examples as disclosed herein.

FIG. 4 illustrates an example of a system control diagram that supports managed memory systems with multiple priority queues in accordance with examples as disclosed herein. The flow diagram 400 shows how an access command received from a host may be processed by CPU 330 as it flows through system 300 of FIG. 3. In some cases, the processes and queues shown within CPU 330 may be performed and positioned within firmware and the queues within front end 310 and back end 320 may be positioned within hardware. In some cases, some or all of the processes may be run by an execution unit of CPU 330. Using the queues and other portions shown in the system control diagram 400, the received commands may be processed according to their priorities and positions within the queues.

As described with reference to FIG. 3, access commands received from the host 305 may be added to command queue 335. The commands may be retrieved from command queue 335 by CPU 330 and passed through a command handler 405. Command handler 405 may decode the commands to determine each command's priority level. In some systems, one or more fields in the access command may indicate the priority level of the command. Each command may be routed from the command queue to a corresponding priority queue 410 based on the determined priority. For example, if the command is high priority, it may be put in high priority queue 410-a; if the command is low priority, it may be put in low priority queue 410-b.

One or more command routers 415 may determine how the access commands in the priority queues 410 should be routed. To do this, command routers 415 may determine the type of access that corresponds to each command. For example, command routers 415 may determine whether an access command is a read command or a write command. Each command may be put in a corresponding handler queue 420 based on the determined priority and type. For example, for commands from high priority queue 410-a, if the command is a write type, it may be put in high write handler queue 420-a1 and if the command is a read type, it may be put in high read handler queue 420-a2. For commands from low priority queue 410-b, if the command is a write type, it may be put in low write handler queue 420-b1 and if the command is a read type, it may be put in low read handler queue 420-b2. Although two command routers 415-a and 415-b are shown, they may be combined into a single router, if desired.

Arbitration logic may also be used by command routers 415 to determine the order in which the high and low priority commands may be processed. This arbitration logic may be used in conjunction with or in place of the arbitration logic discussed above with reference to FIG. 3. As discussed above, although high priority access commands may be prioritized over low priority access commands, the low priority commands may still be processed in a timely manner (e.g., not stalled). One example of such arbitration logic is discussed below with reference to FIG. 5. In one example, a low priority command may be moved up in an order when the command has not been processed within a minimum time frame.

One or more process handlers 425 may process the access commands in the handler queues 420. In some cases, a separate process handler 425 may be used for each handler queue 420. For example, a high write process handler 425-a1 may process the access commands in high write handler queue 420-a1, a high read process handler 425-a2 may process the access commands in high read handler queue 420-a2, a low write process handler 425-b1 may process the access commands in low write handler queue 420-b1, and a low read process handler 425-b2 may process the access commands in low read handler queue 420-b2.

In some cases, each process handler 425 may run independent of the others. That is, the process handlers 425 may run concurrently with each other. In other words, the process handlers may each be an active process, although only one is executed at a given instruction cycle. Each of the process handlers 425 may be a different thread. The execution unit may switch between process handlers 425 according to thread or process scheduling (e.g., switching out resources such as program counters, registers, stack pointers, memory addresses, page tables, or kernel resources). In some cases, switching between process handlers 425 accounts for the prioritization of the process handlers 425 (e.g., high read process handler 425-a2 may be provided more processing resources or execution cycles than low read process handler 425-b2). In some cases, when an access command is added to a handler queue 420, the process handler 425 associated with the handler queue may be activated to begin the command execution.

To execute the access commands, the process handlers 425 may use front end 310 and back end 320. For example, to control the processing of a command, e.g., in the manner discussed with reference to FIG. 3, a process handler 425 may use a write command state machine 430 or a read command state machine 435, as applicable. In one example, a prioritization of executing access commands by write command state machine 430 or read command state machine 435 may be based on the number of commands in each handler queue 420. Write command state machine 430 or read command state machine 435 may manipulate front end CQs 345 and back end SQs 340, based on inputs 440 from front end SQs 340 and inputs 445 from back end CQs 345, as discussed above. The high priority CQs and SQs may be utilized by the high priority process handlers 425-a and the low priority SQs and CQs may be utilized by the low priority process handlers 425-b.

For example, for a write command, write process handlers 425-a1 and 425-b1 may i) add an entry to a front end CQ 345 to let front end 310 know of the write command and include a pointer to the location in the buffer where to store the received data; ii) determine from a front end SQ 340 when the data has been stored in the buffer; iii) add an entry to a back end SQ 340 to let back end 320 know of the write command and include a pointer to the location in the buffer where the data is located and a pointer to the location in storage 325 where to store the data; and iv) determine from a back end CQ 345 when the data corresponding to the write command has been successfully written to storage 325.

As another example, for a read command, read process handlers 425-a2 and 425-b2 may i) add an entry to the back end SQ 340 to let back end 320 know of the read command, and include a pointer to the location in storage 325 where the data to be read is located and pointer to the location in the buffer where to store the data; ii) determine from the back end CQ 345 when the data has been stored in the buffer; iii) add the entry to the front end CQ 345 to let front end 310 know of the read command, and include a pointer to the location where in the buffer the data is located; and iv) determine from the front end SQ 340 when the data corresponding to the read command has been successfully transmitted to the host 305.

Process handlers 425 may run concurrently to process the access commands in their respective handler queues 420. In some cases, a task scheduler (not shown) may be used to avoid conflicts between process handlers 425 and to prioritize execution of the access commands based on various factors, such as the access command's priority, how many access commands are in each handler queue 420, and the like.

One or more of the processes and/or queues of CPU 330 may be combined, if desired. For example, the command handling and command routing may be combined such that when retrieved from command queue 335, an access command may be put in its corresponding Handler Queue 420 without first being put in a priority queue 410.

The processes may be used for additional priorities and/or types. For example, if a third priority is used, CPU 330 may use three priority queues 410, three routers 415, six handler queues 420, and six process handlers 425. This can be adapted to accommodate other numbers of priorities and access types.

Figure 5:
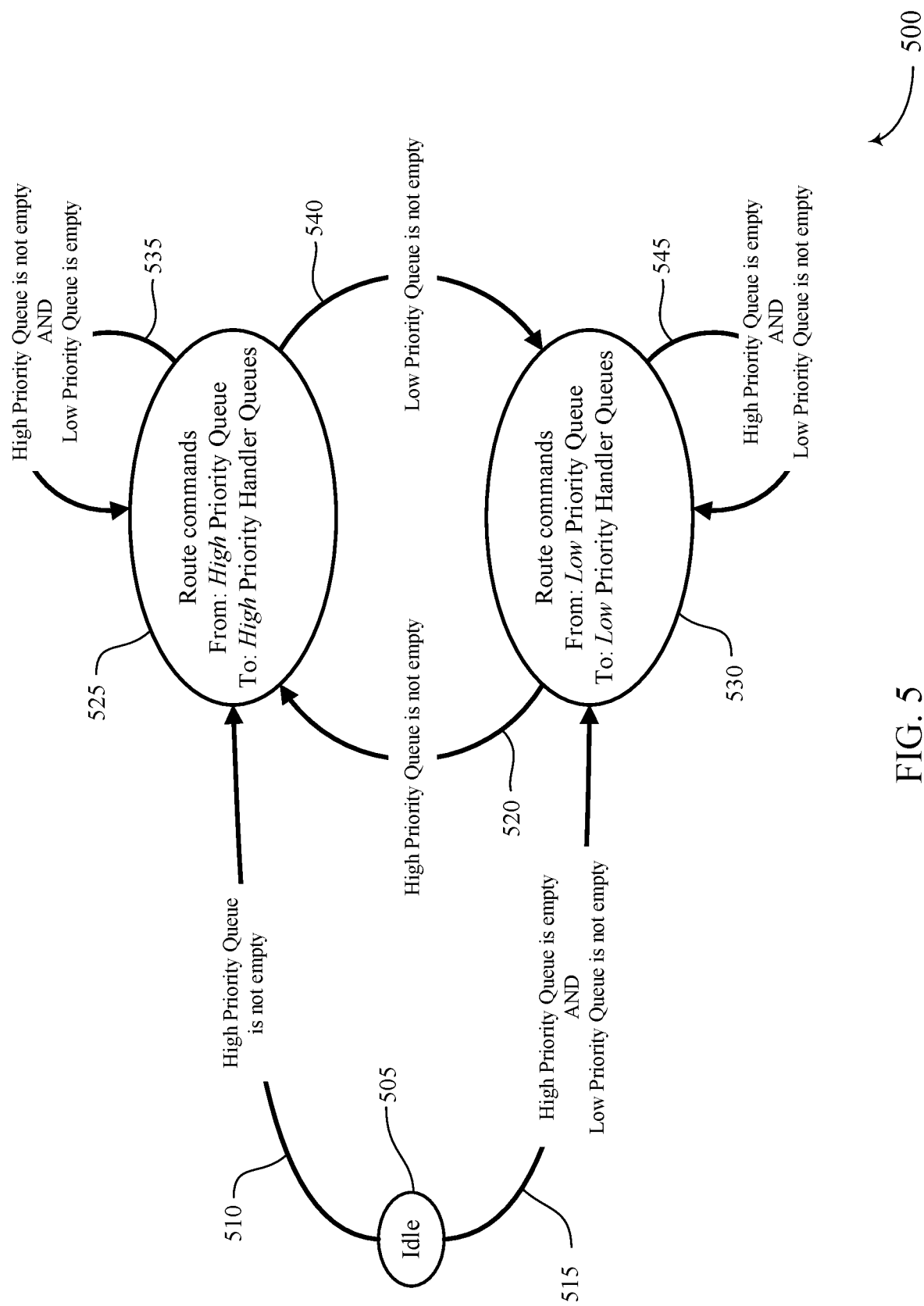
FIG. 5 shows a diagram illustrating an example of a state machine that supports managed memory systems with multiple priority queues in accordance with aspects of the present disclosure.

FIG. 5 shows a diagram illustrating an example of a state machine 500 that supports managed memory systems with multiple priority queues in accordance with examples as disclosed herein. State machine 500 may be an example of an anti-stall process that may prevent stalling due to multiple queue priorities. State machine 500 may handle concurrent high and low priority traffic such that low priority commands may not stall. State machine 500 may be an example of the arbitration logic discussed with reference to FIG. 4.

During operation, the command routers 415 may periodically analyze the priority queues 410 and move any commands therein to the handler queues 420 using a modified round robin technique. During each analysis, the number of commands $N_H$ and $N_L$ within high priority queue 410-a and low priority queue 410-b, respectively, may be determined by the command routers 415. When at least one of the priority queues 410 is not empty ($N_H>0$ or $N_L>0$), state machine 500 may be entered at state 505. If high priority queue 410-a is not empty ($N_H>0$), the logic may follow path 510 to state 525. If high priority queue 410-a is empty and low priority queue is not empty ($N_H=0$, $N_L>0$), the logic may follow path 515 to state 530.

At state 525, the commands corresponding to $N_H$ may be routed from high priority queue 410-a to respective high write handler queue 420-a1 or high read handler queue 420-a2. That is, each command that was counted as part of $N_H$ may be removed or dequeued from high priority queue 410-a and added to one of the high handler queues 420-a. During the routing, new entries may be added to high priority queue 410-a by command handlers 405. These new entries may be ignored and not routed. That is, the new entries may not be considered for routing until state 525 is next entered.

Once routing of the commands has been completed in state 525, the priority queues 410 may be checked again to determine if any new commands were added to the queues during the routing. To do this, the number of commands $N_H$ and $N_L$ within high priority queue 410-a and low priority queue 410-b, respectively, may again be determined. If low priority queue 410-b is not empty ($N_L>0$) while the high priority queue 410-*a* is empty ($N_H=0$) or an anti-stall condition is reached (e.g., a first quantity of commands from the high priority queue 410-*a* have been processed consecutively), the logic may follow path 540 to state 530 to route the newly added low priority entries to one of the low handler queues 420-*b*. If low priority queue 410-*b* is empty but high priority queue 410-*a* is not empty ($N_H>0$, $N_L=0$), the logic may reenter state 525, as shown by path 535, to route the newly added high priority entries to one of the high handler queues 420-*a*. If both priority queues are empty ($N_H=0$, $N_L=0$), state machine 500 may be exited.

At state 530, the commands corresponding to NI, may be routed from low priority queue 410-*b* to respective low write handler queue 420-*b*1 or low read handler queue 420-*b*2. That is, each command that was counted as part of $N_L$ may be removed or dequeued from low priority queue 410-*b* and added to one of the low handler queues 420-*b*. During the routing, new entries may be added to low priority queue 410-*b* by command handlers 405. These new entries may be ignored and not routed. That is, the new entries may not be considered for routing until state 530 is next entered.

Once routing of the commands has been completed in state 530, the priority queues 410 may be checked again to determine if any new commands were added to the queues during the routing. To do this, the number of commands $N_H$ and $N_L$ within high priority queue 410-*a* and low priority queue 410-*b*, respectively, may again be determined. If high priority queue 410-*a* is not empty ($N_H>0$) while the low priority queue 410-*a* is empty ($N_L=0$) or an anti-stall condition is reached (e.g., a second quantity of commands from the high priority queue 410-*a* have been processed consecutively), the logic may follow path 520 to state 525 to route the newly added high priority entries to one of the high handler queues 420-*a*. In some cases, the second quantity of commands may be lower than the first quantity of commands. If high priority queue 410-*a* is empty but low priority queue 410-*b* is not empty ($N_H=0$, $N_L>0$), the logic may reenter state 530, as shown by path 545, to route the newly added low priority entries to one of the low handler queues 420-*b*. If both priority queues are empty ($N_H=0$, $N_L=0$), state machine 500 may be exited.

Moving between states 525 and 530, along paths 520 and 540 in the manner discussed above, may continue until both priority queues become empty, at which time state machine 500 may be exited. This may allow the low priority commands to be executed in a timely manner and not be stalled.

Figure 6:
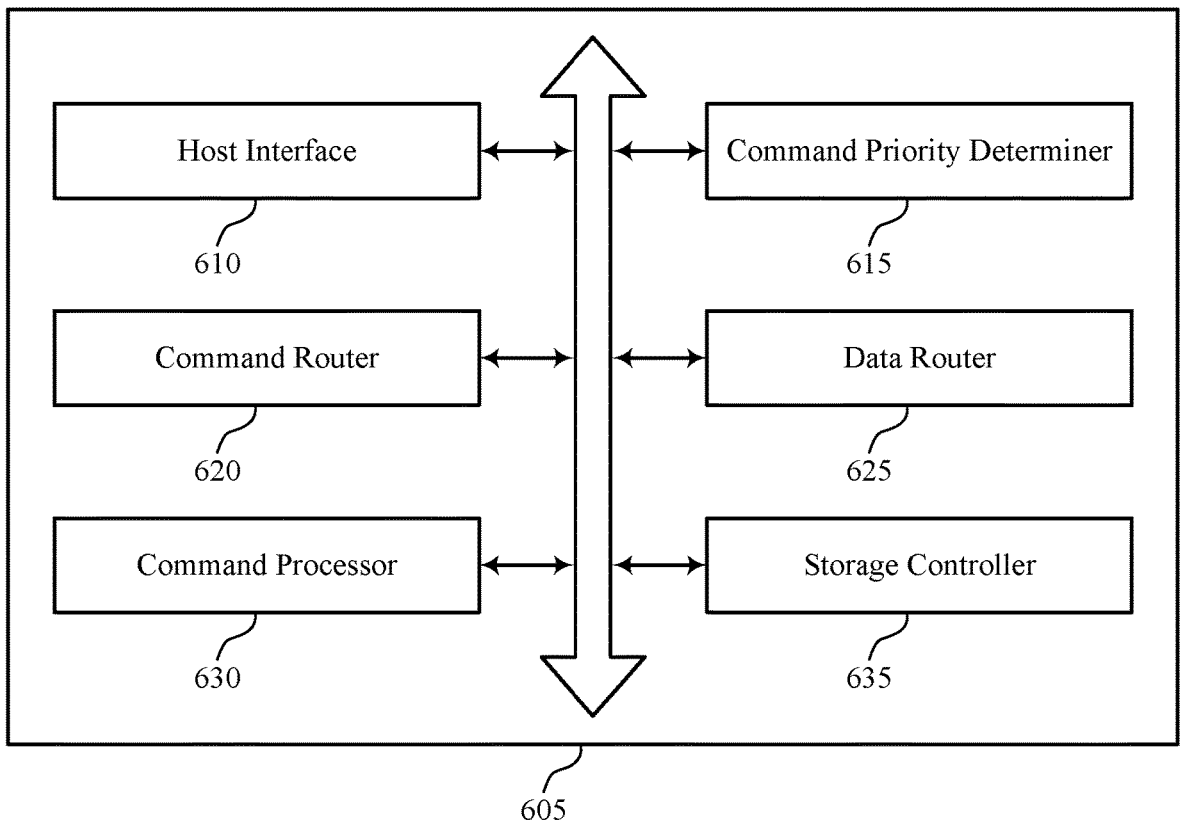
FIG. 6 shows a block diagram of a memory system that supports managed memory systems with multiple priority queues in accordance with aspects of the present disclosure.

FIG. 6 shows a block diagram 600 of a memory system 605 that supports managed memory systems with multiple priority queues in accordance with examples as disclosed herein. The memory system 605 may be an example of aspects of a memory system as described with reference to FIGS. 2-5. The memory system 605 may include a host interface 610, a command priority determiner 615, a command router 620, a data router 625, a command processor 630, and a storage controller 635. Each of these modules may communicate, directly or indirectly, with one another (e.g., via one or more buses).

The host interface 610 may receive, at an interface, memory access commands from a host. In some examples, the host interface 610 may store memory access commands in a command queue. In some examples, the host interface 610 may send to a host, by the interface, data retrieved from a buffer. In some examples, the host interface 610 may send to a host a first subset of data associated with a first subset of memory access commands. In some examples, the host interface 610 may send to a host a second subset of data associated with a second subset of memory access commands. In some examples, the host interface 610 may receive, by the interface from a host, data associated with memory write commands.

The command priority determiner 615 may determine a first subset of memory access commands associated with a first priority and a second subset of memory access commands associated with a second priority. In some cases, the first subset of memory access commands may be associated with read commands associated with the first priority. In some cases, the second subset of memory access commands may be associated with read commands associated with the second priority. In some examples, the command priority determiner 615 may determine a third subset of memory access commands associated with write commands associated with a first priority and a fourth subset of memory access commands associated with write commands associated with a second priority.

The command router 620 may route, from a command queue to a first queue, a first subset of memory access commands associated with a first priority. In some examples, the command router 620 may route, from a command queue to a second queue, a second subset of memory access commands associated with a second priority. In some examples, the command router 620 may route, from a command queue to a fifth queue, a third subset of the memory access commands associated with the first priority. In some examples, the command router 620 may route, from a command queue to a sixth queue, a fourth subset of memory access commands associated with the second priority.

The data router 625 may store, in a buffer coupled with an interface, data associated with memory access commands. In some examples, the data router 625 may retrieve, by the interface, data associated with memory read commands from a buffer.

The command processor 630 may process, by a processor including an execution unit, a first subset of memory access commands from a first queue to a third queue at a storage controller according to a first process, the third queue associated with a first priority. In some examples, the command processor 630 may process, by the processor, a second subset of memory access commands from a second queue to a fourth queue at the storage controller according to a second process, the fourth queue associated with the second priority. In some examples, the first and second processes may be run concurrently by the execution unit according to one or more parameters for prioritization between the first priority and the second priority.

In some examples, the command processor 630 may move a memory access command of the fourth queue up in the order when the memory access command has not been processed within a minimum time frame. In some examples, the command processor 630 may process, by the processor, a third subset of memory access commands from a fifth queue to the third queue at the storage controller according to a third process. In some examples, the command processor 630 may process, by the processor, a fourth subset of memory access commands from a sixth queue to the fourth queue at the storage controller according to a fourth process. In some examples, the third and fourth processes may be run concurrently by the execution unit with the first and second processes according to the one or more parameters for prioritization between the first priority and the second priority.

In some cases, the memory access commands include memory read commands. In some cases, the memory access commands include memory write commands.

The storage controller 635 may move data associated with memory access commands between a buffer and a storage memory including a set of memory cells. In some examples, the storage controller 635 may move data between the buffer and the storage memory based on contents of a third queue and a fourth queue. In some examples, the storage controller 635 may determine an order of processing memory access commands of the third and fourth queues based on respective first and second priorities of the third and fourth queues. In some examples, the storage controller 635 may move data between the buffer and the storage memory based on the order of processing the memory access commands of the third and fourth queues.

In some examples, the storage controller 635 may move data associated with memory read commands from the storage memory to the buffer. In some examples, the storage controller 635 may move data from the buffer to storage memory. In some examples, the storage controller 635 may move data from the buffer to the storage memory based on arbitration logic that determines an order of processing memory access commands of the third and fourth queues based on respective first and second priorities of the third and fourth queues.

Figure 7:
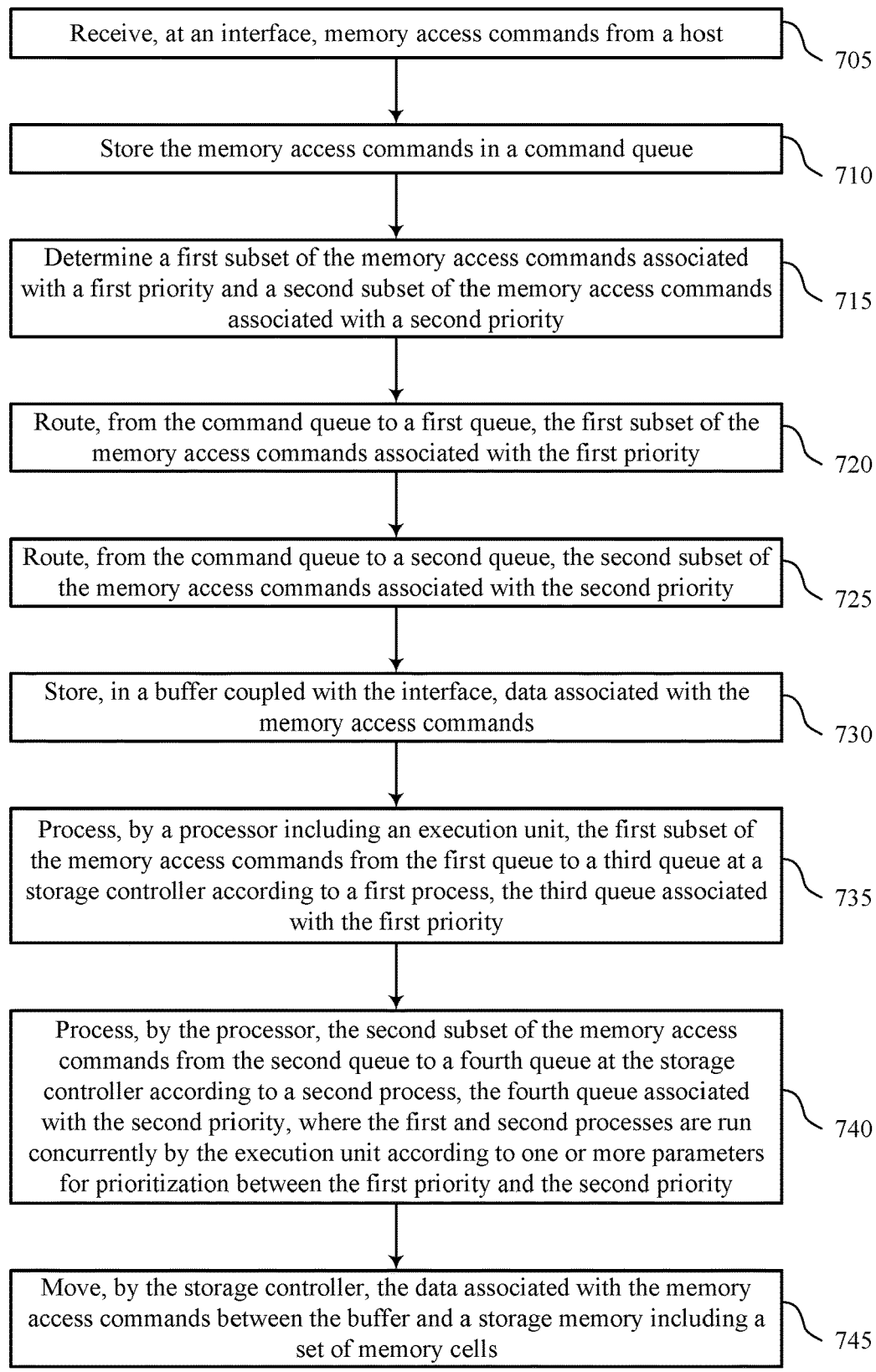
FIG. 7 shows a flowchart illustrating a method that supports managed memory systems with multiple priority queues in accordance with examples as disclosed herein.

FIG. 7 shows a flowchart illustrating a method that supports managed memory systems with multiple priority queues in accordance with aspects of the present disclosure. The operations of method 700 may be implemented by a memory system or its components as described herein. For example, the operations of method 700 may be performed by a memory system as described with reference to FIG. 6. In some examples, a memory system may execute a set of instructions to control the functional elements of the memory system to perform the described functions. Additionally or alternatively, a memory system may perform aspects of the described functions using special-purpose hardware.

At 705, the memory system may receive, at an interface, memory access commands from a host. The operations of 705 may be performed according to the methods described herein. In some examples, aspects of the operations of 705 may be performed by a host interface as described with reference to FIG. 6.

At 710, the memory system may store the memory access commands in a command queue. The operations of 710 may be performed according to the methods described herein. In some examples, aspects of the operations of 710 may be performed by a host interface as described with reference to FIG. 6.

At 715, the memory system may determine a first subset of the memory access commands associated with a first priority and a second subset of the memory access commands associated with a second priority. The operations of 715 may be performed according to the methods described herein. In some examples, aspects of the operations of 715 may be performed by a command priority determiner as described with reference to FIG. 6.

At 720, the memory system may route, from the command queue to a first queue, the first subset of the memory access commands associated with the first priority. The operations of 720 may be performed according to the methods described herein. In some examples, aspects of the operations of 720 may be performed by a command router as described with reference to FIG. 6.

At 725, the memory system may route, from the command queue to a second queue, the second subset of the memory access commands associated with the second priority. The operations of 725 may be performed according to the methods described herein. In some examples, aspects of the operations of 725 may be performed by a command router as described with reference to FIG. 6.

At 730, the memory system may store, in a buffer coupled with the interface, data associated with the memory access commands. The operations of 730 may be performed according to the methods described herein. In some examples, aspects of the operations of 730 may be performed by a data router as described with reference to FIG. 6.

At 735, the memory system may process, by a processor including an execution unit, the first subset of the memory access commands from the first queue to a third queue at a storage controller according to a first process, the third queue associated with the first priority. The operations of 735 may be performed according to the methods described herein. In some examples, aspects of the operations of 735 may be performed by a command processor as described with reference to FIG. 6.

At 740, the memory system may process, by the processor, the second subset of the memory access commands from the second queue to a fourth queue at the storage controller according to a second process, the fourth queue associated with the second priority, where the first and second processes are run concurrently by the execution unit according to one or more parameters for prioritization between the first priority and the second priority. The operations of 740 may be performed according to the methods described herein. In some examples, aspects of the operations of 740 may be performed by a command processor as described with reference to FIG. 6.

At 745, the memory system may move, by the storage controller, the data associated with the memory access commands between the buffer and a storage memory including a set of memory cells. The operations of 745 may be performed according to the methods described herein. In some examples, aspects of the operations of 745 may be performed by a storage controller as described with reference to FIG. 6.

In some examples, an apparatus as described herein may perform a method or methods, such as the method 700. The apparatus may include features, means, or instructions (e.g., a non-transitory computer-readable medium storing instructions executable by a processor) for: receiving, at an interface, memory access commands from a host; storing the memory access commands in a command queue; determining a first subset of the memory access commands associated with a first priority and a second subset of the memory access commands associated with a second priority; routing, from the command queue to a first queue, the first subset of the memory access commands associated with the first priority; routing, from the command queue to a second queue, the second subset of the memory access commands associated with the second priority; storing, in a buffer coupled with the interface, data associated with the memory access commands; processing, by a processor including an execution unit, the first subset of the memory access commands from the first queue to a third queue at a storage controller according to a first process, the third queue associated with the first priority; processing, by the processor, the second subset of the memory access commands from the second queue to a fourth queue at the storage controller according to a second process, the fourth queue associated with the second priority, where the first and second processes are run concurrently by the execution unit according to one or more parameters for prioritization between the first priority and the second priority; and moving, by the storage controller, the data associated with the memory access commands between the buffer and a storage memory including a set of memory cells.

In some examples of the method 700 and the apparatus described herein, moving the data between the buffer and the storage memory may include operations, features, means, or instructions for moving the data between the buffer and the storage memory based on contents of the third queue and the fourth queue.

Some examples of the method 700 and the apparatus described herein may further include operations, features, means, or instructions for determining, by the storage controller, an order of processing the memory access commands of the third and fourth queues based on the respective first and second priorities of the third and fourth queues.

In some examples of the method 700 and the apparatus described herein, moving the data between the buffer and the storage memory may include operations, features, means, or instructions for moving the data between the buffer and the storage memory based on the order of processing the memory access commands of the third and fourth queues.

In some examples of the method 700 and the apparatus described herein, determining the order of processing of the memory access commands of the third and fourth queues may include operations, features, means, or instructions for moving a memory access command of the fourth queue up in the order when the memory access command may have not been processed within a minimum time frame.

In some examples of the method 700 and the apparatus described herein, the memory access commands include memory read commands. In some examples of the method 700 and the apparatus described herein, the memory access commands include memory write commands In some examples of the method 700 and the apparatus described herein, moving the data between the buffer and the storage memory may include operations, features, means, or instructions for moving, by the storage controller, the data associated with the memory read commands from the storage memory to the buffer.

Some examples of the method 700 and the apparatus described herein may further include operations, features, means, or instructions for retrieving, by the interface, the data associated with the memory read commands from the buffer, and sending to the host, by the interface, the data retrieved from the buffer.

In some examples of the method 700 and the apparatus described herein, sending to the host the data retrieved from the buffer may include operations, features, means, or instructions for sending to the host a first subset of data associated with the first subset of the memory access commands, and sending to the host a second subset of data associated with the second subset of the memory access commands.

Some examples of the method 700 and the apparatus described herein may further include operations, features, means, or instructions for receiving, by the interface from the host, the data associated with the memory write commands.

In some examples of the method 700 and the apparatus described herein, moving the data between the buffer and the storage memory may include operations, features, means, or instructions for moving, by the storage controller, the data from the buffer to the storage memory.

In some examples of the method 700 and the apparatus described herein, moving the data from the buffer to the storage memory may include operations, features, means, or instructions for moving, by the storage controller, the data from the buffer to the storage memory based on arbitration logic that determines an order of processing the memory access commands of the third and fourth queues based on the respective first and second priorities of the third and fourth queues.

In some examples of the method 700 and the apparatus described herein, the first subset of the memory access commands may be associated with read commands associated with the first priority, and the second subset of the memory access commands may be associated with read commands associated with the second priority.

Some examples of the method 700 and the apparatus described herein may further include operations, features, means, or instructions for determining a third subset of the memory access commands associated with write commands associated with the first priority and a fourth subset of the memory access commands associated with write commands associated with the second priority; routing, from the command queue to a fifth queue, the third subset of the memory access commands associated with the first priority; routing, from the command queue to a sixth queue, the fourth subset of the memory access commands associated with the second priority; processing, by the processor, the third subset of the memory access commands from the fifth queue to the third queue at the storage controller according to a third process; and processing, by the processor, the fourth subset of the memory access commands from the sixth queue to the fourth queue at the storage controller according to a fourth process, where the third and fourth processes may be run concurrently by the execution unit with the first and second processes according to the one or more parameters for prioritization between the first priority and the second priority.

It should be noted that the methods described above describe possible implementations, and that the operations and the steps may be rearranged or otherwise modified and that other implementations are possible. Further, portions from two or more of the methods may be combined.

An apparatus is described. The apparatus may include an interface configured to receive memory access commands from a host and to send and receive data associated with the memory access commands. The interface may include a processor. The processor may include a first queue configured to store a first subset of the memory access commands associated with a first priority; a second queue configured to store a second subset of the memory access commands associated with a second priority; one or more command routers configured to obtain the memory access commands from the command queue, determine the first and second subsets of the memory access commands, and store the first and second subsets in the first and second queues, respectively. The apparatus may also include a buffer coupled with the interface and configured to store the data associated with the memory access commands. The apparatus may also include a storage memory including a set of memory cells. The apparatus may also include a storage controller configured to move the data associated with the memory access commands between the buffer and the storage memory. The storage controller may include a third queue associated with the first priority, a fourth queue associated with the second priority. The processor may be configured to process the first subset of the memory access commands from the first queue to the third queue according to a first process and the second subset of the memory access commands from the second queue to the fourth queue according to a second process, where the first and second processes are configured to be run concurrently by the execution unit according to one or more parameters for prioritization between the first priority and the second priority.

In some examples, the storage controller may further include arbitration logic configured to determine an order of processing the memory access commands of the third and fourth queues based on the respective first and second priorities of the third and fourth queues. In some examples, the storage controller may be configured to move the data associated with the memory access commands of the third and fourth queues based on the order of processing the memory access commands of the third and fourth queues.

In some examples, the processor further may include a fifth queue and a sixth queue. The first subset of the memory access commands may be associated with read commands associated with the first priority. The second subset of the memory access commands may be associated with read commands associated with the second priority. The fifth queue may be configured to store a third subset of the memory access commands associated with write commands associated with the first priority. The sixth queue may be configured to store a fourth subset of the memory access commands associated with write commands associated with the second priority.

In some examples, the one or more command routers may be further configured to determine the third and fourth subsets of the memory access commands and store the third and fourth subsets in the fifth and sixth queues, respectively. The processor may be further configured to process the third subset of the memory access commands from the fifth queue to the third queue according to a third process and the fourth subset of the memory access commands from the sixth queue to the fourth queue according to a fourth process. The third and fourth processes may be configured to be run concurrently with the first and second processes by the execution unit according to the one or more parameters for prioritization between the first priority and the second priority.

In some examples, the processor further may include operations, features, means, or instructions for logic configured to process a memory access command associated with the second priority when the memory access command may have not been processed within a minimum time frame.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the terms "electronic communication," "conductive contact," "connected," and "coupled" may refer to a relationship between components that supports the flow of signals between the components. Components are considered in electronic communication with (or in conductive contact with or connected with or coupled with) one another if there is a conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

As used herein, the term "coupling" refers to a condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

As used herein, the term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

A portion or all of the functions described herein may be implemented in hardware, software executed by a processor, firmware, or any combination thereof. If implemented in software executed by a processor, the functions may be one or more instructions or code stored on or transmitted over a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A memory system, comprising:
   one or more memory arrays; and
   processing circuitry coupled with the one or more memory arrays and configured to cause the memory system to:
   receive a plurality of access commands;
   move a first subset of the plurality of access commands from a first queue to a third queue associated with a first priority;
   move, concurrent with moving the first subset of the plurality of access commands from the first queue to the third queue, a second subset of the plurality of access commands from a second queue to a fourth queue associated with a second priority;
   process the first subset of the plurality of access commands and the second subset of the plurality of access commands concurrently based at least in part on a quantity of the plurality of access commands in a command queue for a prioritization between the first priority and the second priority; and
   transfer data associated with the plurality of access commands between a buffer and a storage memory based at least in part on processing the first subset of the plurality of access commands and the second subset of the plurality of access commands concurrently.

2. The memory system of claim 1, wherein the processing circuitry is further configured to cause the memory system to:
   determine whether the first subset of the plurality of access commands is associated with the first priority, wherein moving the first subset of the plurality of access commands is based at least in part on determining that the first subset of the plurality of access commands is associated with the first priority.

3. The memory system of claim 1, wherein the processing circuitry is further configured to cause the memory system to:
   determine whether the second subset of the plurality of access commands is associated with the second priority, wherein moving the second subset of the plurality of access commands is based at least in part on determining the second subset of the plurality of access commands associated with the second priority.

4. The memory system of claim 1, wherein the processing circuitry is further configured to cause the memory system to:
   route, from the command queue to the first queue, the first subset of the plurality of access commands based at least in part on receiving the plurality of access commands, wherein moving the first subset is based at least in part on routing the first subset of the plurality of access commands.

5. The memory system of claim 1, wherein the processing circuitry is further configured to cause the memory system to:
   route, from the command queue to the second queue, the second subset of the plurality of access commands based at least in part on receiving the plurality of access commands, wherein moving the second subset is based at least in part on routing the second subset of the plurality of access commands.

6. The memory system of claim 1, wherein the processing circuitry is further configured to cause the memory system to:
   store, in the buffer, the data associated with the plurality of access commands based at least in part on receiving the plurality of access commands, wherein moving the first subset of the plurality of access commands and moving the second subset of the plurality of access commands is based at least in part on storing the data.

7. The memory system of claim 1, wherein the processing circuitry is further configured to cause the memory system to:
   store the plurality of access commands in the command queue based at least in part on receiving the plurality of access commands.

8. The memory system of claim 1, wherein the processing circuitry is further configured to cause the memory system to:
   determining whether a quantity of the first subset of the plurality of access commands in the first queue satisfies a threshold, wherein moving the first subset of the plurality of access commands from the first queue to the third queue is based at least in part on determining that quantity of the first subset of the plurality of access commands in the first queue satisfies the threshold.

9. The memory system of claim 1, wherein the processing circuitry is further configured to cause the memory system to:
determining whether a quantity of the second subset of the plurality of access commands in the second queue satisfies a threshold, wherein moving the second subset of the plurality of access commands from the second queue to the fourth queue is based at least in part on determining that quantity of the second subset of the plurality of access commands in the second queue satisfies the threshold.

10. A non-transitory computer-readable medium storing code comprising instructions which, when executed by one or more processors of a memory system, cause the memory system to:
receive a plurality of access commands;
move a first subset of the plurality of access commands from a first queue to a third queue associated with a first priority;
move, concurrent with moving the first subset of the plurality of access commands from the first queue to the third queue, a second subset of the plurality of access commands from a second queue to a fourth queue associated with a second priority;
process the first subset of the plurality of access commands and the second subset of the plurality of access commands concurrently based at least in part on a quantity of the plurality of access commands in a command queue for a prioritization between the first priority and the second priority; and
transfer data associated with the plurality of access commands between a buffer and a storage memory based at least in part on processing the first subset and the second subset.

11. The non-transitory computer-readable medium of claim 10, wherein the instructions, when executed by the one or more processors of the memory system, further cause the memory system to:
move, from the command queue to the first queue, the first subset of the plurality of access commands based at least in part on receiving the plurality of access commands.

12. The non-transitory computer-readable medium of claim 10, wherein the instructions, when executed by the one or more processors of the memory system, further cause the memory system to:
move, from the command queue to the second queue, the second subset of the plurality of access commands based at least in part on receiving the plurality of access commands.

13. The non-transitory computer-readable medium of claim 10, wherein the instructions, when executed by the one or more processors of the memory system, further cause the memory system to:
store the data associated with the plurality of access commands based at least in part on receiving the plurality of access commands, wherein moving the first subset of the plurality of access commands and moving the second subset of the plurality of access commands is based at least in part on storing the data.

14. An apparatus, comprising:
an interface configured to receive a plurality of access commands;
a command queue configured to store the plurality of access commands received by the interface;
a first queue configured to store a first subset of the plurality of access commands associated with a first priority;
a second queue configured to store a second subset of the plurality of access commands associated with a second priority;
a third queue associated with the first priority;
a fourth queue associated with the second priority;
processing circuitry, wherein the processing circuitry is configured to:
move, concurrent with moving the first subset of the plurality of access commands from the first queue to the third queue, the second subset of the plurality of access commands from the second queue to the fourth queue; and
process the first subset of the plurality of access commands and the second subset of the plurality of access commands concurrently based at least in part on a quantity of the plurality of access commands in the command queue for a prioritization between the first priority and the second priority; and
a storage controller configured to:
transfer data associated with the plurality of access commands between a buffer and a storage memory based at least in part on processing the first subset of the plurality of access commands and the second subset of the plurality of access commands concurrently.

15. The apparatus of claim 14, further comprising:
one or more command routers coupled with the command queue and configured to receive the plurality of access commands from the command queue.

16. The apparatus of claim 15, wherein the one or more command routers are further configured to:
determine whether the first subset of the plurality of access commands is associated with the first priority, wherein moving the first subset of the plurality of access commands is based at least in part on determining that the first subset of the plurality of access commands is associated with the first priority; and
determine whether the second subset of the plurality of access commands is associated with the second priority, wherein moving the second subset of the plurality of access commands is based at least in part on determining the second subset of the plurality of access commands associated with the second priority.

17. The apparatus of claim 15, wherein the one or more command routers are further configured to:
store the first subset of the plurality of access commands in the first queue based at least in part on receiving the plurality of access commands; and
store the second subset of the plurality of access commands in the second queue based at least in part on receiving the plurality of access commands.

18. The apparatus of claim 14, wherein the buffer is coupled with the interface and configured to store the data associated with the plurality of access commands.

19. The apparatus of claim 14, wherein the storage memory is coupled with the buffer and comprises a plurality of memory cells.

20. The apparatus of claim 14, wherein the storage controller comprises the third queue and the fourth queue.

* * * * *